United States Patent
Konada et al.

(10) Patent No.: US 12,036,836 B2
(45) Date of Patent: Jul. 16, 2024

(54) ELECTRICALLY POWERED SUSPENSION SYSTEM

(71) Applicant: HONDA MOTOR CO., LTD., Tokyo (JP)

(72) Inventors: Kazuya Konada, Wako (JP); Takashi Yanagi, Wako (JP); Ryosuke Yamazaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 352 days.

(21) Appl. No.: 17/679,395

(22) Filed: Feb. 24, 2022

(65) Prior Publication Data

US 2022/0297496 A1    Sep. 22, 2022

(30) Foreign Application Priority Data

Mar. 22, 2021   (JP) ................. 2021-047964

(51) Int. Cl.
B60G 17/0165   (2006.01)

(52) U.S. Cl.
CPC ...... *B60G 17/0165* (2013.01); *B60G 2202/42* (2013.01); *B60G 2400/82* (2013.01); *B60G 2500/10* (2013.01)

(58) Field of Classification Search
CPC .. B60G 17/0165; B60G 17/06; B60G 17/015; B60G 17/018; B60G 17/0182; B60G 2202/42; B60G 2400/82; B60G 2400/102; B60G 2400/204; B60G 2400/252; B60G 2401/142; B60G 2600/02; B60G 2500/10; B60G 7/04; B60G 2204/45; B60G 2204/419
USPC ........................... 701/37, 38, 39, 40
See application file for complete search history.

(56) References Cited

FOREIGN PATENT DOCUMENTS

| JP | 4-169315 | * | 6/1992 | ........... B60G 17/015 |
| JP | 4-173414 | * | 6/1992 | ........... B60G 17/015 |
| JP | 2017-141900 A | | 8/2017 | |
| JP | 2018-134899 A | | 8/2018 | |

* cited by examiner

*Primary Examiner* — Hai H Huynh
(74) *Attorney, Agent, or Firm* — Rankin, Hill & Clark LLP

(57) ABSTRACT

An electrically powered suspension system includes: an actuator that generates a load for damping vibration of the vehicle body; an information acquisition part that acquires information on a sprung state amount and a road surface state; a target load calculation part that calculates a first target load related to skyhook control based on the sprung state amount and calculates a second target load related to preview control based on the road surface state; and a load control part. The target load calculation part is further configured to calculate a third target load related to virtual spring force control based on a stroke position and to calculate a combined target load into which the first target load, the second target load, and the third target load have been combined. The load control part performs load control of the actuator using the combined target load.

7 Claims, 7 Drawing Sheets

ELECTRICALLY POWERED SUSPENSION SYSTEM

CROSS-REFERENCE TO RELATED APPLICATIONS

The present application claims the foreign priority benefit under Title 35 U.S.C. § 119 of Japanese Patent Application No. 2021-047964, filed on Mar. 22, 2021, in the Japan Patent Office, the disclosure of which is herein incorporated by reference in its entirety.

BACKGROUND OF THE INVENTION

1. Field of the Invention

The present invention relates to an electrically powered suspension system including an actuator that is provided between a vehicle body and a wheel of a vehicle and configured to generate a load for damping vibration of the vehicle body.

2. Description of Related Art

An electrically powered suspension system including an actuator provided between a vehicle body and a wheel of a vehicle and configured to generate a load for damping vibration of the vehicle body is conventionally known. For example, see Japanese Patent Publication No. 2018-134899 (hereinafter referred to as Patent Literature 1).

The electrically powered suspension system described in Patent Literature 1 includes, in a system through which influence of an input of a disturbance is outputted with a delay, a control device that controls a control target that is capable of controlling the output. The control device generates a control instruction that cancels the influence of the disturbance on the basis of: a transfer function from the input of the disturbance to the output of the system; a transfer function from a control instruction to the output, the control instruction being to be issued to the control target controlling the output of the system; and information on the disturbance inputted to the system.

According to the electrically powered suspension system described in Patent Literature 1, the control device operates so as to cancel the vibration of the vehicle body caused by the road surface input, thereby to reduce the vibration of the vehicle body.

Japanese Patent Application Publication No. 2017-141900 (hereinafter referred to as Patent Literature 2) describes a suspension device including a bump stopper made of a cushioning material. The bump stopper of the suspension device serves to absorb an impact due to a large input of irregularities of a road to a damper by causing the bump stopper to abut an end portion of the damper. With this, the suspension device attempts to alleviate the feeling of reaching a bottom of the damper so that the ride quality of the vehicle can be kept at a good level.

Incidentally, the description of the electrically powered suspension system of the invention described in Patent Literature 1 fails to describe or suggest how to buffer the impact that is caused when a large input due to irregularities of a road surface is applied to a damper. So the invention may suffer from deterioration of the ride quality when a large input is applied to a damper while the vehicle is traveling.

SUMMARY OF INVENTION

In view of the above-described situation, an object of the present invention is to provide an electrically powered suspension system that is capable of, even when a large input is applied to a damper while the vehicle is traveling, maintaining a good ride quality by buffering such a large input.

To achieve the above-described object, an electrically powered suspension system according to a first aspect of the present invention includes: an actuator provided between a vehicle body and a wheel of a vehicle and configured to generate a load for damping vibration of the vehicle body; an information acquisition part configured to acquire information on a sprung state amount of the vehicle and information on a road surface state of a road on which the vehicle is traveling; a target load calculation part configured to calculate a first target load related to skyhook control based on the sprung state amount and to calculate a second target load related to preview control based on the road surface state of the road on which the vehicle is traveling; and a load control part configured to perform load control of the actuator using the calculation results of the target load calculation part. The information acquisition part is further configured to acquire information related to a stroke position of the actuator. The electrically powered suspension system further includes a determiner part configured to determine, on the basis of the information related to the stroke position, whether the stroke position has reached an irregular range out of a regular range. The target load calculation part is further configured to, when the stroke position is determined by the determiner part as having reached the irregular range, calculate a third target load related to virtual spring force control based on the stroke position and to calculate a combined target load into which the first target load, the second target load, and the third target load have been combined. The load control part performs load control of the actuator using the combined target load.

According to the present invention, even when a large input is applied to a damper while the vehicle is traveling, it is possible to maintain a good ride quality by buffering such a large input.

DETAILED DESCRIPTION OF THE EMBODIMENTS

Figure 1:
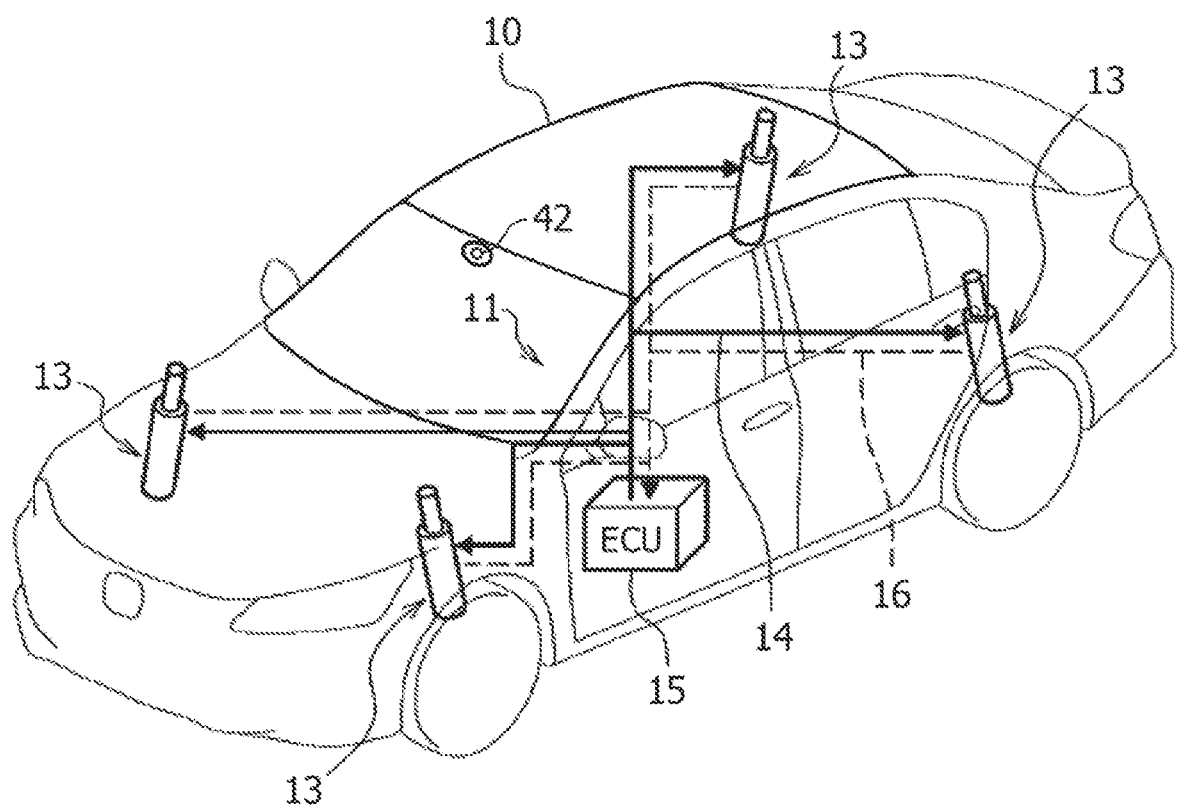
FIG. 1 is a view illustrating an entire configuration of an electrically powered suspension system according to an embodiment of the present invention.

An electrically powered suspension system 11 according to an embodiment of the present invention will be described in detail below with reference to the drawings as appropriate.

Note that, in the drawings referenced hereinafter, basically, members having the same function are denoted by the same reference sign. In this case, as a general rule, a redundant description will be omitted. For convenience of explanation, sizes and shapes of components may be schematically illustrated with deformation or in an exaggerated manner.

Basic Configuration Common to Electrically Powered Suspension Systems 11 According to Embodiments of the Present Invention Firstly, a description will be given of a basic configuration common to the electrically powered suspension systems 11 according to the embodiments of the present invention with reference to FIGS. 1 and 2.

FIG. 1 is a view illustrating an entire configuration common to the electrically powered suspension systems 11 according to the embodiments of the present invention. FIG. 2 is a partial cross-sectional view of an electromagnetic actuator 13 included in the electrically powered suspension system 11.

As illustrated in FIG. 1, the electrically powered suspension system 11 according to the embodiment of the present invention includes a plurality of electromagnetic actuators 13 respectively provided to the wheels of a vehicle 10, and a load control ECU 15. The plurality of electromagnetic actuators 13 and the load control ECU 15 are connected to each other with respective electric power supply lines 14 (see the solid lines in FIG. 1), through which load control electric power is supplied from the load control ECU 15 to the plurality of electromagnetic actuators 13, and with respective signal lines 16 (see the broken lines in FIG. 1), through which load control signals of electric motors 31 (see FIG. 2) are fed from the plurality of electromagnetic actuators 13 to the load control ECU 15.

In the present embodiment, a total of four electromagnetic actuators 13 are provided respectively to the front wheels (front left wheel and front right wheel) and the rear wheels (rear left wheel and rear right wheel). The electromagnetic actuators 13 provided respectively to the wheels are each separately controlled to damp vibration in conjunction with expansion/contraction operations for the corresponding wheel.

In the embodiment of the present invention, unless otherwise noted, the plurality of electromagnetic actuators 13 each have a common configuration. As such, the configuration of one electromagnetic actuator 13 will be described below as a representative of the plurality of electromagnetic actuators 13.

Figure 2:
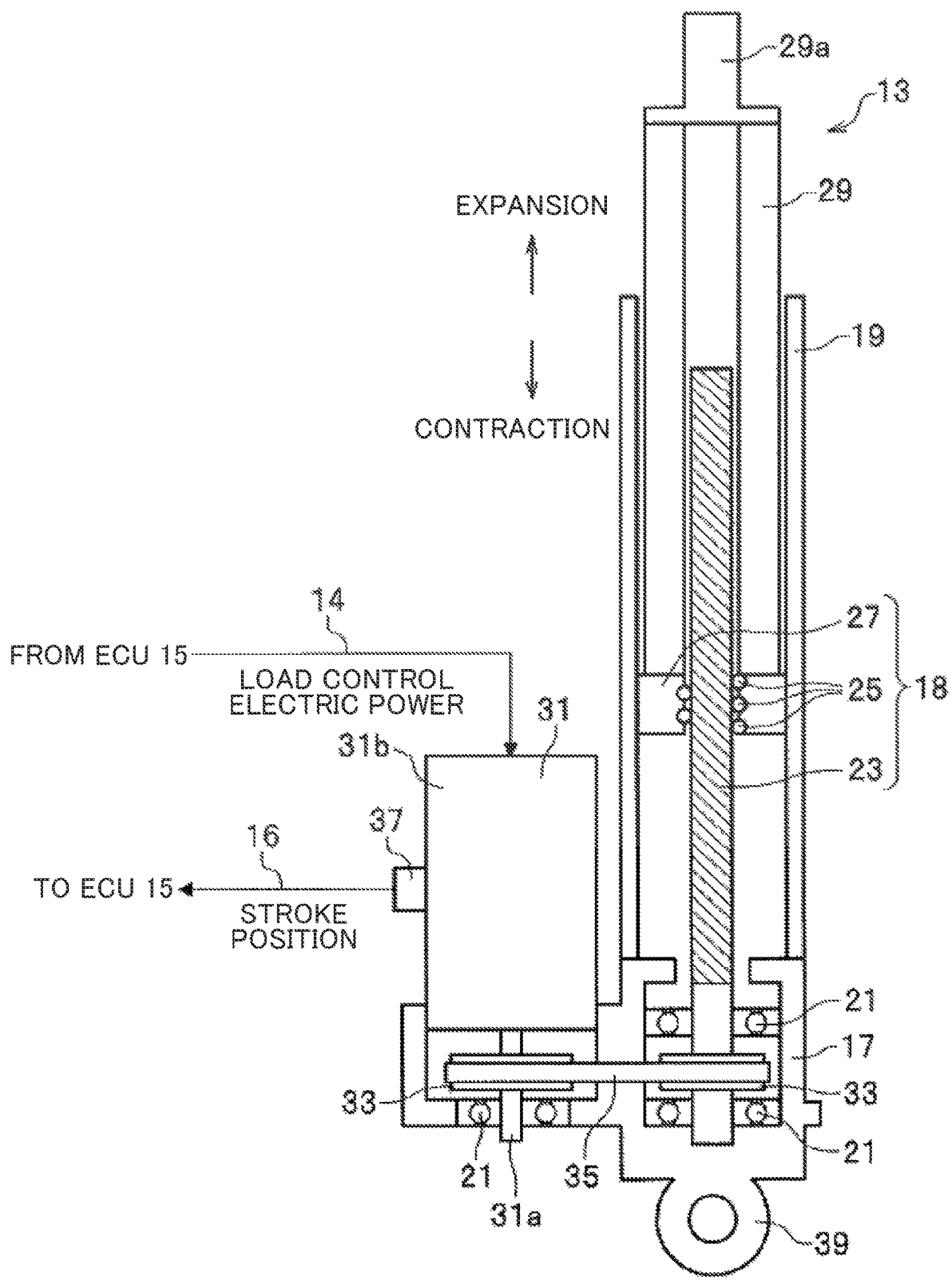
FIG. 2 is a partial cross-sectional view of an electromagnetic actuator included in the electrically powered suspension system according to the embodiment of the present invention.

As illustrated in FIG. 2, the electromagnetic actuator 13 includes a base housing 17, an outer tube 19, a ball bearing 21, a ball screw shaft 23, a plurality of balls 25, a nut 27, and an inner tube 29.

The base housing 17 supports a proximal end side of the ball screw shaft 23 via the ball bearing 21 such that the ball screw shaft 23 is rotatable about its axis. The outer tube 19 is provided on the base housing 17 and accommodates a ball screw mechanism 18 including the ball screw shaft 23, the plurality of balls 25, and the nut 27. The plurality of balls 25 roll along a screw groove of the ball screw shaft 23. The nut 27 is engaged with the ball screw shaft 23 via the plurality of balls 25 and converts a rotational motion of the ball screw shaft 23 into a linear motion. The inner tube 29, which is coupled to the nut 27, moves along the axial directions of the outer tube 19 together with the nut 27.

In order to transmit a rotational driving force to the ball screw shaft 23, the electromagnetic actuator 13 includes the electric motor 31, a pair of pulleys 33, and a belt member 35, as illustrated in FIG. 2. The electric motor 31 is provided on the base housing 17 in parallel to the outer tube 19. The pulleys 33 are respectively attached to a motor shaft 31a of the electric motor 31 and the ball screw shaft 23. The belt member 35, which is for transmitting the rotational driving force of the electric motor 31 to the ball screw shaft 23, is wrapped around the pair of pulleys 33.

The electric motor 31 is provided with a resolver 37 that detects a rotation angle signal of the electric motor 31. The rotation angle signal of the electric motor 31, detected by the resolver 37, is fed to the load control ECU 15 via the signal line 16. The rotational driving of the electric motor 31 is controlled in accordance with the load control electric power which is supplied by the load control ECU 15 to the corresponding one of the plurality of electromagnetic actuators 13 via the electric power supply line 14.

As illustrated in FIG. 2, the present embodiment employs a layout in which the motor shaft 31a of the electric motor 31 and the ball screw shaft 23 are arranged substantially in parallel and connected with each other, thereby shortening the axial dimension of the electromagnetic actuator 13. Alternatively, another layout may be employed in which, for example, the motor shaft 31a of the electric motor 31 and the ball screw shaft 23 are coaxially arranged and connected to each other.

As illustrated in FIG. 2, the electromagnetic actuator 13 according to this embodiment of the present invention has a connecting portion 39 provided at a lower end of the base housing 17. The connecting portion 39 is connected and fixed to a not-shown unsprung member on the wheel side, non-limiting examples of which unsprung member include a lower arm and a knuckle. On the other hand, an upper end portion 29a of the inner tube 29 is connected and fixed to a not-shown sprung member on the vehicle body side, non-limiting examples of which sprung member include a strut tower portion.

In short, the electromagnetic actuator 13 is arranged in parallel with a not-shown spring member (suspension) provided between the sprung member (vehicle body) and the unsprung member (wheel to which a tire is attached and the like) of the vehicle 10. The electromagnetic actuator 13 serves as a virtual damper that buffers the expansion/contraction force of the spring member (suspension).

The electromagnetic actuator 13 configured as described above operates as follows. Specifically, consider a case where, for example, a thrust related to upward vibration is inputted into the connecting portion 39 from the wheel side of the vehicle 10. In such a case, the inner tube 29 and the nut 27 attempt to descend together with respect to the outer tube 19, to which the thrust relating to the upward vibration has been applied. In response to this, the ball screw shaft 23 attempts to rotate in a direction to follow the descending of the nut 27. In this event, the electric motor 31 is caused to generate a rotational driving force in a direction in which the rotational driving force impedes the descending of the nut 27. This rotational driving force of the electric motor 31 is transmitted to the ball screw shaft 23 via the belt member 35.

In this manner, the electromagnetic actuator 13 exerts a reaction force (attenuation force) on the ball screw shaft 23 against the thrust related to the upward vibration, thereby to attenuate the vibration being to be transmitted from the wheel side to the vehicle body side.

[Internal Configuration of Load Control ECU 15]

Next, a description will be given of internal and peripheral configurations of the load control ECU 15 included in the electrically powered suspension system 11 according to the embodiment of the present invention, with reference to FIG. 3.

Figure 3:
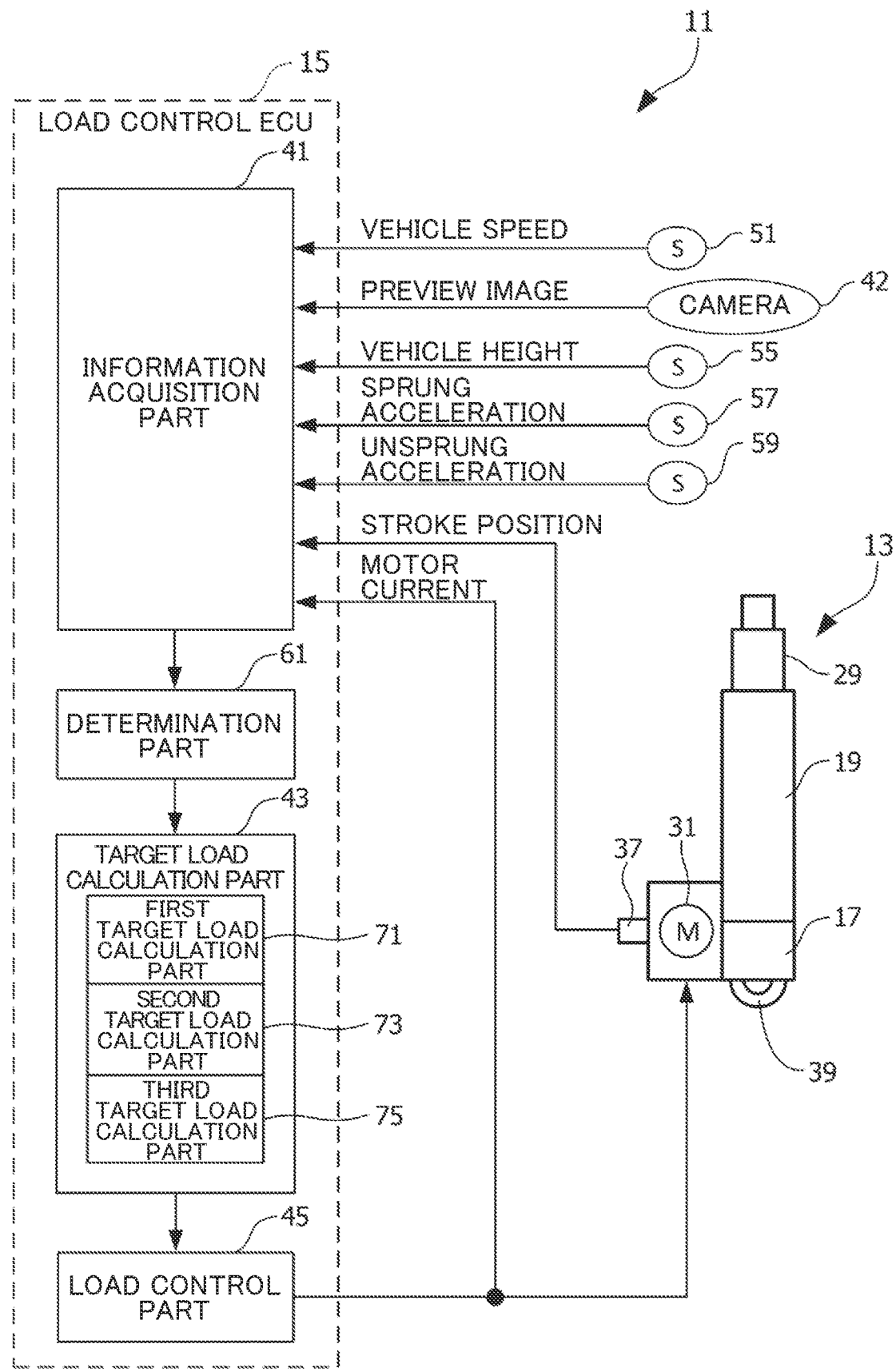
FIG. 3 is a block diagram illustrating internal and peripheral parts of a load control ECU (Electronic Control Unit) included in the electrically powered suspension system according to the embodiment of the present invention.

FIG. 3 is a block diagram illustrating internal and peripheral parts of the load control ECU 15 included in the electrically powered suspension system 11 according to the embodiment of the present invention.

Electrically Powered Suspension System 11 According to Embodiment of the Present Invention The load control ECU 15 included in the electrically powered suspension system 11 according to the embodiment of the present invention includes a microcomputer that performs various arithmetic processing operations. As illustrated in FIG. 3, the load control ECU 15 performs load control on each of the plurality of electromagnetic actuators 13 on the basis of the rotation angle signal including information on the stroke position ST of the electric motor 31, detected by the resolver 37, a combined target load (details described below), a motor current to be applied to the electric motor 31, and the like. With this, the load control ECU 15 has a load control function that generates a load for an attenuation operation or an expansion/contraction operation of the electromagnetic actuator 13.

In order to implement such a load control function, the load control ECU 15 includes an information acquisition part 41, a determiner part 61, a target load calculation part 43, and a load control part 45, as illustrated in FIG. 3.

As illustrated in FIG. 3, the information acquisition part 41 acquires time-series information on the vehicle speed of the vehicle 10 and the stroke position ST of the electromagnetic actuator 13, and acquires information on a preview image and a vehicle height as time-series information on a road surface state of a road which is located in the advancing direction of the vehicle 10 and on which the vehicle 10 is traveling.

The information on the vehicle speed may be acquired through a vehicle speed sensor 51 that detects the vehicle speed of the vehicle 10.

The information on the stroke position ST of the electromagnetic actuator 13 may be acquired through a rotation angle signal of the electric motor 31 detected by a resolver 37.

The information on the preview image may be acquired through, in addition to a camera 42 provided on the vehicle 10, external world sensors such as a radar and a LIDAR system. The information on the vehicle height may be acquired, for example, through a vehicle height sensor 55 that detects the vehicle height of the vehicle 10.

The information acquisition part 41 further acquires time-series information on a sprung acceleration and time-series information on an unsprung acceleration. The time-series information on the sprung acceleration may be acquired based on detection values of a sprung acceleration sensor 57 provided on the sprung member (vehicle body) of the vehicle 10. The time-series information on the unsprung acceleration may be acquired based on detection values of an unsprung acceleration sensor 59 provided on the unsprung member (wheel and the like) of the vehicle 10.

The pieces of information on the vehicle speed, the stroke position ST of the electromagnetic actuator 13, the preview image, the vehicle height, the sprung acceleration, the unsprung acceleration, and the motor current for the electric motor 31, acquired by the information acquisition part 41, are fed to the determiner part 61 and the target load calculation part 43.

The determiner part 61 is configured to determine whether the electromagnetic actuator 13 is likely to fall into a full-bump state on the expansion side or the contraction side, on the basis of the information on the preview image acquired by the information acquisition part 41 and information on the stroke position ST of the electromagnetic actuator 13. The configurations of the determiner part 61 will be described in detail later.

The determination result of the determiner part 61 is fed to the target load calculation part 43.

The target load calculation part 43 has a function of figuring out a combined target load, which is a target value for an attenuation operation or expansion/contraction operation of the electromagnetic actuator 13, by calculation using the various pieces of information acquired by the information acquisition part 41.

The target load calculation part 43 includes a first target load calculation part 71 configured to calculate a first target load for skyhook control, a second target load calculation part 73 configured to calculate a second target load for preview control, and a third target load calculation part 75 configured to calculate a third target load for virtual spring force control. The configurations of the first target load calculation part 71, the second target load calculation part 73, and the third target load calculation part 75 will be described in detail later.

The load control part 45 calculates a target current value that can produce the combined target load figured out by the target load calculation part 43. The load control part 45 then performs drive control on the electric motor 31 included in each of the plurality of electromagnetic actuators 13 so that the motor current for the electric motor 31 will follow the target current value calculated. The plurality of electromagnetic actuators 13 are controlled separately to perform load control with respective electric motors 31.

[Configuration of Main Part of Load Control ECU 15 Included in Electrically Powered Suspension System 11]

Next, a description will be given of an internal configuration of the load control ECU 15 included in the electrically powered suspension system 11 according to the embodiment of the present invention, with reference to FIGS. 4, 5A, and 5B as appropriate.

Figure 4:
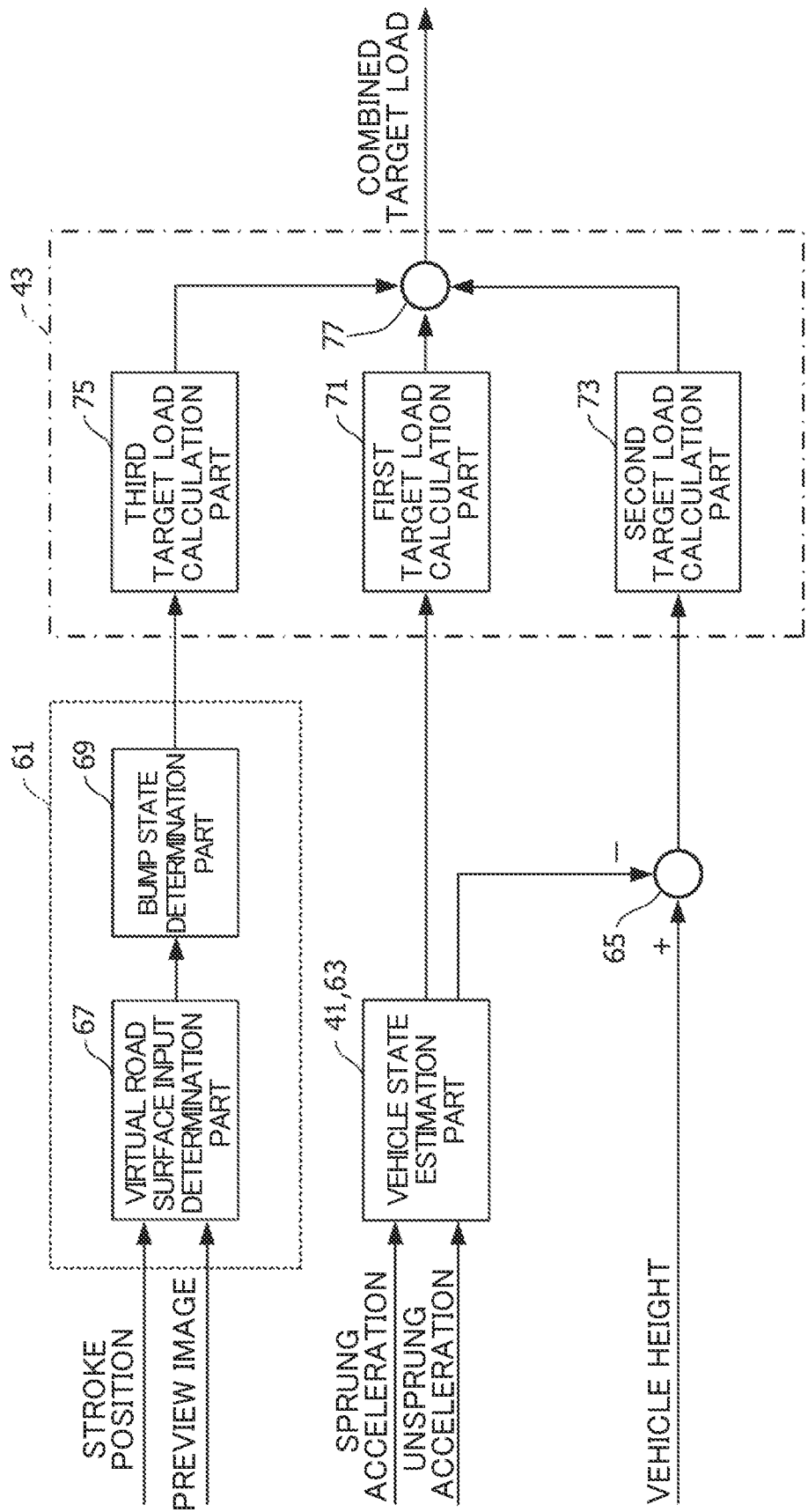
FIG. 4 is a block diagram conceptually illustrating an internal configuration of the load control ECU included in the electrically powered suspension system according to the embodiment of the present invention.

FIG. 4 is a block diagram conceptually illustrating an internal configuration of the load control ECU 15 included in the electrically powered suspension system 11 according to the embodiment of the present invention. FIGS. 5A and 5B are each a conceptual diagram for explaining operations of the electrically powered suspension system 11.

As illustrated in FIG. 4, the load control ECU 15 included the electrically powered suspension system 11 includes: a determiner part 61, a vehicle state estimation part 63, a subtractor part 65, the first target load calculation part 71, the second target load calculation part 73, the third target load calculation part 75, and a combiner part 77. The vehicle state estimation part 63 also serves as the information acquisition part 41. The first target load calculation part 71, the second target load calculation part 73, and the third target load calculation part 75 are included in the target load calculation part 43.

The determiner part 61 includes a virtual road surface input determiner part 67 and a bump state determiner part 69.

The virtual road surface input determiner part 67 included in the determiner part 61 determines a virtual road surface input level VR on the basis of, of the information on the preview image acquired by the information acquisition part 41, information on a road surface state of a road which is located in the advancing direction of the vehicle 10 and on which the vehicle 10 is traveling. Here, the virtual road surface input is a virtual input estimated on the basis of the preview image.

Specifically, for example, when the virtual road surface input determiner part 67 recognizes, through an analysis of the preview image, a hole called pothole in the road on which the vehicle 10 is traveling, the virtual road surface input determiner part 67 determines the virtual road surface input level VR on the basis of the size and the depth of the pothole, the distance to the pothole, the vehicle speed of the vehicle 10, and the like. The determination result regarding the virtual road surface input level VR is fed to the bump state determiner part 69.

Figure 5A:
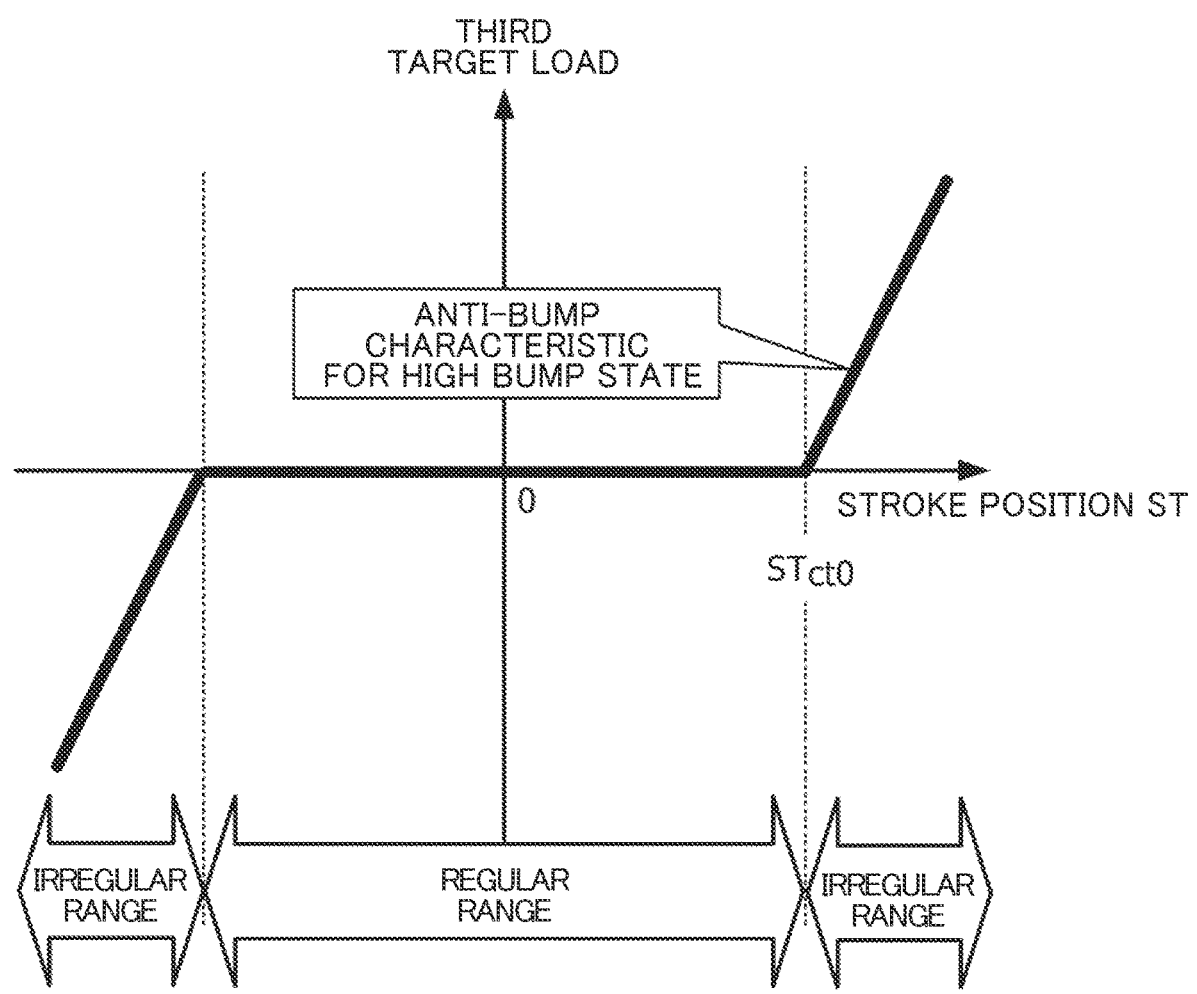
FIG. 5A is a conceptual diagram for explaining operations of the electrically powered suspension system according to the embodiment of the present invention.

The bump state determiner part 69 included in the determiner part 61 determines, on the basis of the information on the stroke position ST of the electromagnetic actuator 13, acquired by the information acquisition part 41, whether the stroke position ST of the electromagnetic actuator 13 has reached the irregular range out of the regular range (see FIG. 5A). It means that if the stroke position ST of the electromagnetic actuator 13 has reached the irregular range out of the regular range, the electromagnetic actuator 13 is likely to fall into a full-bump state on the expansion side or the contraction side In detail, as illustrated in FIG. 5A, the bump state determiner part 69 determines whether the stroke position ST of the electromagnetic actuator 13 has reached the irregular range, on the basis of whether the stroke position ST of the electromagnetic actuator 13 has exceeded a predetermined standard critical threshold value STct0. The standard critical threshold value STct0 may be determined as appropriate with reference to a standard stroke position ST at which the electromagnetic actuator 13 is considered as falling into a full-bump state.

The bump state determiner part 69 makes a determination regarding a bump state on the basis of the determination result (virtual road surface input level VR) which is related to the virtual road surface input and which is fed from the virtual road surface input determiner part 67. In detail, for example, the bump state determiner part 69 determines whether the virtual road surface input level VR has exceeded a predetermined first road surface input threshold value VRth1 (corresponding to the "road surface input threshold value" of the present invention).

If the virtual road surface input level VR is determined as having exceeded the first road surface input threshold value VRth1 (i.e., VR>VRth1), the bump state determiner part 69 determines that the electromagnetic actuator 13 is likely to fall into a full-bump state (virtual road surface input level is high).

On the other hand, if the virtual road surface input level VR is determined as not having exceeded the first road surface input threshold value VRth1 (i.e., VR≤VRth1), the bump state determiner part 69 determines that the electromagnetic actuator 13 is not likely to fall into a full-bump state (virtual road surface input level is low).

Further, if the virtual road surface input level VR is determined as having exceeded the first road surface input threshold value VRth1 (i.e., VR>VRth1: it is likely to fall into a full-bump state), the bump state determiner part 69 further determines whether the virtual road surface input level VR has exceeded a predetermined second road surface input threshold value VRth2.

If the virtual road surface input level VR is determined as having exceeded the second road surface input threshold value VRth2 (i.e., VR>VRth2>VRth1), the bump state determiner part 69 determines that the electromagnetic actuator 13 is very likely to fall into a full-bump state (virtual road surface input level is very high).

On the other hand, if the virtual road surface input level VR is determined as not having exceeded the second road surface input threshold value VRth2 (i.e., VRth2>VR>VRth1), the bump state determiner part 69 determines that the electromagnetic actuator 13 is likely to fall into a full-bump state (virtual road surface input level is high).

In short, the bump state determiner part 69 determines a bump state as one of three levels (low, high, very high), on the basis of the determination result regarding the virtual road surface input level VR fed from the virtual road surface input determiner part 67. Note that the number of levels regarding the bump state is to be greater than one and is not limited to three.

The information on the stroke position ST of the electromagnetic actuator 13, acquired by the information acquisition part 41, the result of determination by the bump state determiner part 69 regarding whether the stroke position ST has reached the irregular range, and the result of bump state determination by the bump state determiner part 69 are fed to the third target load calculation part 75.

The vehicle state estimation part 63 estimates, for example, as current vehicle state amounts, a sprung speed as first vehicle state amount (sprung state amount) and a time integral of the sprung speed as second vehicle state amount, on the basis of the time-series information on the sprung acceleration and unsprung acceleration acquired by the information acquisition part 41.

The first vehicle state amount (sprung speed) and the second vehicle state amount (time integral of the sprung speed) estimated by the vehicle state estimation part 63 are respectively fed to the first target load calculation part 71 and the subtractor part 65.

The subtractor part 65 subtracts the current second vehicle state amount (time integral of the sprung speed), estimated by the vehicle state estimation part 63, from the current vehicle height acquired by the information acquisition part 41. In this way, the vehicle height is corrected by removing a vehicle height component originating in the variation of the sprung speed from the current vehicle height.

The vehicle height corrected by the subtractor part 65 is fed to the second target load calculation part 73.

The first target load calculation part 71 calculates a first target load related to skyhook control, on the basis of the first vehicle state amount (sprung speed) estimated by the vehicle state estimation part 63. Specifically, for example, the first target load calculation part 71, using a control rule based on the skyhook theory, multiplies the first vehicle state amount (sprung speed) by a skyhook damping coefficient to calculate the first target load.

The first target load calculated by the first target load calculation part 71 is fed to combiner part 77.

The second target load calculation part 73 calculates a second target load related to preview control, on the basis of the vehicle height corrected by the subtractor part 65 (actual height from the road surface). Specifically, for example, the second target load calculation part 73 multiplies, using a control rule based on the skyhook theory, the corrected vehicle height (actual height from the road surface) by a preview control gain to calculate the second target load.

The second target load calculated by the second target load calculation part 73 is fed to combiner part 77.

The third target load calculation part 75 sets an anti-bump characteristic (see FIGS. 5A and 5B) in which the third target load increases approximately linearly with an increase in the stroke position ST of the electromagnetic actuator 13, on the basis of the bump state determination result (low, high, very high) determined by the bump state determiner part 69.

Then, the third target load calculation part 75 calculates a third target load related to virtual spring force control for performing an anti-bump function, on the basis of the stroke position ST of the electromagnetic actuator 13, acquired by the information acquisition part 41, and the set anti-bump characteristic.

The third target load calculated by the third target load calculation part 75 is fed to combiner part 77. Specifics of the function of the third target load calculation part 75 are described in detail later.

The combiner part 77 combines, by addition: the first target load calculated by the first target load calculation part 71, the second target load calculated by the second target load calculation part 73, and the third target load calculated by the third target load calculation part 75, and outputs the result of combining as a combined target load.

The combined target load combined by the combiner part 77 is fed to the load control part 45.

[Operation of Electrically Powered Suspension System 11]

Figure 6:
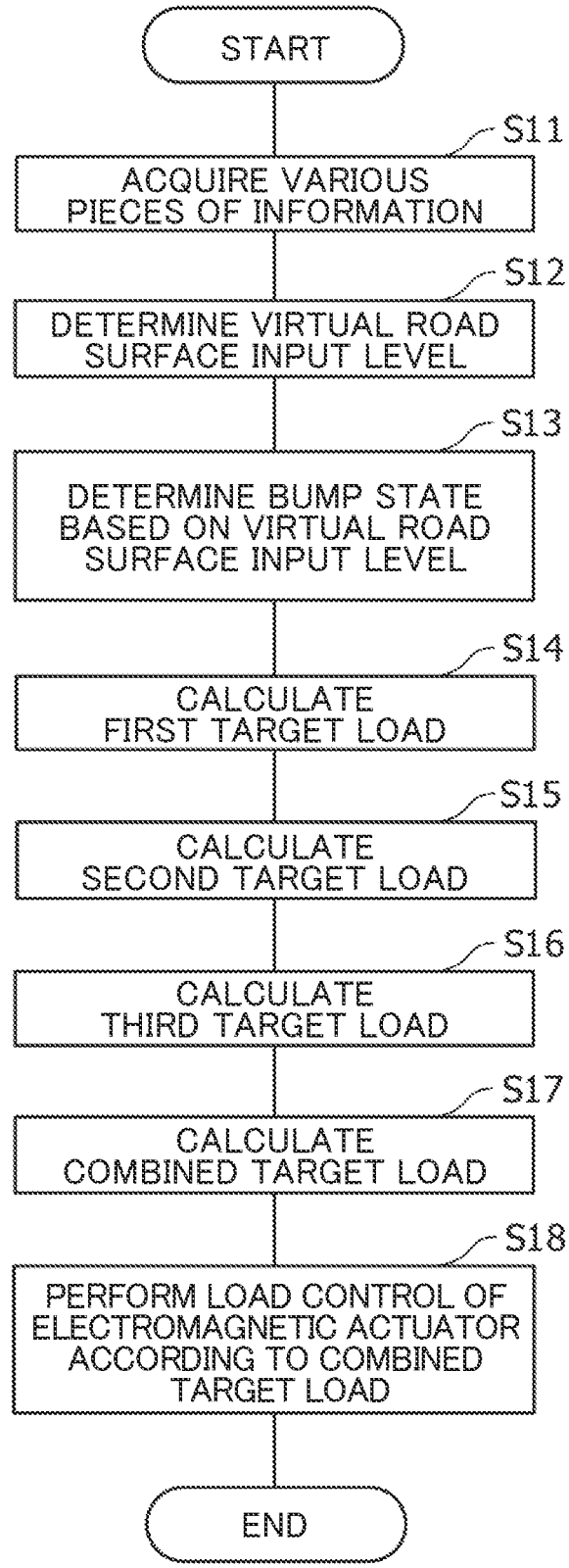
FIG. 6 is a flowchart for explaining operations of the electrically powered suspension system according to the embodiment of the present invention.

Next, a description will be given of the operations of the electrically powered suspension system 11 according to the embodiment of the present invention with reference to FIG. 6. FIG. 6 is a flowchart for explaining operations of the electrically powered suspension system 11 according to the embodiment of the present invention.

Note that FIG. 6 illustrates an exemplary case in which the stroke position ST of the electromagnetic actuator 13 has exceeded the predetermined standard critical threshold value STct0.

In Step S11 illustrated in FIG. 6, the information acquisition part 41 of the load control ECU 15 acquires pieces of information including information on the vehicle speed of the vehicle 10 and the stroke position ST of the electromagnetic actuator 13 and acquires information on a preview image and a vehicle height as time-series information on a road surface state of a road which is located in the advancing direction of the vehicle 10 and on which the vehicle 10 is traveling.

In Steps S12 through S13, the determiner part 61 determines whether the electromagnetic actuator 13 is likely to fall into a full-bump state on the expansion side or the contraction side, on the basis of the information on the preview image acquired by the information acquisition part 41 and information on the stroke position ST of the electromagnetic actuator 13.

At first, in Step S12, the virtual road surface input determiner part 67 included in the determiner part 61 determines a virtual road surface input level VR on the basis of, of the information on the preview image acquired by the information acquisition part 41, information on the road surface state of the road which is located in the advancing direction of the vehicle 10 and on which the vehicle 10 is traveling.

Specifically, for example, when the virtual road surface input determiner part 67 recognizes, through an analysis of the preview image, a hole called pothole in the road on which the vehicle 10 is traveling, the virtual road surface input determiner part 67 determines the virtual road surface input level VR on the basis of the size and the depth of the pothole, the distance to the pothole, the vehicle speed of the vehicle 10, and the like. The determination result regarding the virtual road surface input level VR is fed to the bump state determiner part 69.

In Step S13, the bump state determiner part 69 included in the determiner part 61 determines, on the basis of the information on the stroke position ST of the electromagnetic actuator 13, acquired by the information acquisition part 41, whether the stroke position ST of the electromagnetic actuator 13 has reached the irregular range out of the regular range (see FIG. 5A).

The bump state determiner part 69 determines bump state as one of three levels (low, high, very high), on the basis of the determination result regarding the virtual road surface input level VR fed from the virtual road surface input determiner part 67

The information on the stroke position ST of the electromagnetic actuator 13, acquired by the information acquisition part 41, the result of determination by the bump state determiner part 69 regarding whether the stroke position ST has reached the irregular range, and the result of bump state determination by the bump state determiner part 69 are fed to the third target load calculation part 75.

In Step S14, the first target load calculation part 71 of the load control ECU 15 calculates a first target load related to skyhook control, on the basis of the first vehicle state amount (sprung speed) estimated by the vehicle state estimation part 63. The first target load calculated by the first target load calculation part 71 is a load to reduce vibration that cannot be reduced by the second target load related to the next-described preview control (e.g., vibration due to a factor other than the road surface input).

In Step S15, the subtractor part 65 included in the load control ECU 15 subtracts the current second vehicle state amount (time integral of the sprung speed), estimated by the vehicle state estimation part 63, from the current vehicle height acquired by the information acquisition part 41. In this way, the vehicle height is corrected by removing a vehicle height component originating in the variation of the sprung speed from the current vehicle height.

The second target load calculation part 73 of the load control ECU 15 calculates a second target load related to preview control, on the basis of the vehicle height corrected by the subtractor part 65 (actual height from the road surface). The second target load calculated by the second target load calculation part 73 is a load to reduce a vibration due to a road surface input.

In Step S16, the third target load calculation part 75 of the load control ECU 15 sets an anti-bump characteristic (see FIGS. 5A and 5B) defining the variation in the third target load with respect to the variation in the stroke position ST of the electromagnetic actuator 13, on the basis of the bump state determination result (e.g., low, high, or very high) determined by the bump state determiner part 69.

Then, the third target load calculation part 75 calculates a third target load related to virtual spring force control for performing an anti-bump function, on the basis of the stroke position ST of the electromagnetic actuator 13, acquired by the information acquisition part 41, and the set anti-bump characteristic.

In Step S17, the combiner part 77 combines, by addition: the first target load calculated by the first target load calculation part 71, the second target load calculated by the second target load calculation part 73, and the third target load calculated by the third target load calculation part 75, and outputs the result of combining as a combined target load.

In Step S18, the load control part 45 included in the load control ECU 15 performs load control of the electromagnetic actuator 13 according to the combined target load, which is the calculation result out of Step S16. After that, the load control ECU 15 completes one cycle of the processes.

Advantageous Effects of Electrically Powered Suspension System 11 According to Embodiment of Present Invention An electrically powered suspension system 11 according to a first aspect includes: an actuator (electromagnetic actuator 13) provided between a vehicle body and a wheel of a vehicle 10 and configured to generate a load for damping vibration of the vehicle body; an information acquisition part 41 configured to acquire information on a sprung state amount of the vehicle 10 and information on a road surface state of a road on which the vehicle 10 is traveling; a target load calculation part 43 configured to calculate a first target load related to skyhook control based on a sprung state amount and to calculate a second target load related to preview control based on the road surface state of the road on which the vehicle 10 is traveling, and a load control part 45 configured to perform load control of the electromagnetic actuator 13 using the calculation result of the target load calculation part 43.

The information acquisition part 41 is further configured to acquire information on a stroke position ST of the electromagnetic actuator 13. The electromagnetic actuator 13 further includes a determiner part 61 configured to determine whether the stroke position ST has reached an irregular range out of a regular range, on the basis of the information on the stroke position ST.

The target load calculation part 43 is further configured to, when the stroke position ST is determined by the determiner part 61 as having reached the irregular range, calculate a third target load related to virtual spring force control based on the stroke position ST and to calculate a combined target load into which the first target load, the second target load, and the third target load have been combined. The load control part 45 performs load control of the electromagnetic actuator 13 using the combined target load.

In the electrically powered suspension system 11 according to the first aspect, the target load calculation part 43 is further configured to, when the stroke position ST is determined by the determiner part 61 as having reached the irregular range, calculate a third target load related to virtual spring force control based on the stroke position ST and to calculate a combined target load into which the first target load, the second target load, and the third target load have been combined. The load control part 45 performs load control of the electromagnetic actuator 13 using the combined target load.

With the electrically powered suspension system 11 according to the first aspect, the combined target load is calculated by combining the third target load related to the virtual spring force control in an anti-damp direction (direction toward the center position of strokes) in addition to the first target load related to the skyhook control and the second target load related to the preview control, and this combined target load is used to perform load control of the electromagnetic actuator 13. As a result, even when a large input is applied to the damper while the vehicle 10 is traveling, it is possible to maintain a good ride quality by buffering such a large input.

Moreover, with the electrically powered suspension system 11 according to the first aspect, in a suspension device including a bump stopper made of a cushioning material, a secondary effect is expected such that the bump stopper can be reduced in size (i.e., the effective stroke can be extended).

An electrically powered suspension system 11 according to a second aspect is the electrically powered suspension system 11 according to the first aspect, wherein the information acquisition part 41 is further configured to acquire information on a preview image ahead in an advancing direction of the vehicle 10 and the determiner part 61 is further configured to determine a virtual road surface input level VR on the basis of the information on the preview image. The load control part 45 may be further configured such that when the virtual road surface input level VR is determined by the determiner part 61 as having exceeded a predetermined road surface input threshold value (first road surface input threshold value VRth1), the load control part 45 performs load control of the electromagnetic actuator 13 using the combined target load upon a critical timing at which the stroke position ST is estimated as having reached the irregular range.

The determiner part 61 of the electrically powered suspension system 11 according to the second aspect determines the virtual road surface input level VR on the basis of the information of the preview image. This determination is performed to determine whether the electromagnetic actuator 13 is likely to fall into a full-bump state. When the virtual road surface input level VR is determined by the determiner part 61 as having exceeded a predetermined road surface input threshold value (first road surface input threshold value VRth1), i.e., when the electromagnetic actuator 13 is likely to fall into a full-bump state, the load control part 45 performs load control of the electromagnetic actuator 13 using the combined target load upon a critical timing at which the stroke position ST is estimated as having reached the irregular range.

The critical timing at which the stroke position ST is estimated as having reached the irregular range may be calculated, for example, when a hole called pothole is recognized in the road on which the vehicle 10 is traveling through an analysis of the preview image as a result of the determination of the virtual road surface input level VR, with reference to a distance to the pothole, the vehicle speed of the vehicle 10 and the like.

According to the electrically powered suspension system 11 according to the second aspect, when the electromagnetic actuator 13 is likely to fall into a full-bump state, the load control part 45 performs load control of the electromagnetic actuator 13 using the combined target load upon a critical timing at which the stroke position ST is estimated as having reached the irregular range. As a result, even when a large input is applied to the damper while the vehicle 10 is traveling, it is possible to improve the effect of maintaining a good ride quality by buffering such a large input, compared to the electrically powered suspension system 11 according to the first aspect.

An electrically powered suspension system 11 according to a third aspect is the electrically powered suspension system 11 according to the second aspect, wherein the load control part 45 may be further configured to, even when the virtual road surface input level VR is not determined by the determiner part 61 as having exceeded the first road surface input threshold value VRth1, perform load control of the electromagnetic actuator 13 using the combined target load when the stroke position ST is determined as having reached the irregular range.

In the electrically powered suspension system 11 according to the third aspect, the load control part 45 performs load control of the electromagnetic actuator 13 using the combined target load when the stroke position ST is determined as having reached the irregular range, even when the virtual road surface input level VR is not determined by the determiner part 61 as having exceeded the first road surface input threshold value VRth1 (even when the electromagnetic actuator 13 is not likely to fall into a full-bump state).

According to the electrically powered suspension system 11 according to the third aspect, the load control part 45 performs load control of the electromagnetic actuator 13 using the combined target load when the stroke position ST is determined as having reached the irregular range, even when the electromagnetic actuator 13 is not likely to fall into a full-bump state. As a result, even when a large input is applied to the damper while the vehicle 10 is traveling, it is possible to improve the effect of maintaining a good ride quality by buffering such a large input, compared to the electrically powered suspension system 11 according to the second aspect.

An electrically powered suspension system 11 according to a fourth aspect is the electrically powered suspension system 11 according to the second aspect, wherein the target load calculation part 43 may be further configured to, when the virtual road surface input level VR is determined by the determiner part 61 as having exceeded the first road surface input threshold value VRth1, use the third target load related to virtual spring force control based on the stroke position ST as the combined target load without combining the first target load and the second target load.

In the electrically powered suspension system 11 according to the fourth aspect, when the virtual road surface input level VR is determined by the determiner part 61 as having exceeded the first road surface input threshold value VRth1 (when the electromagnetic actuator 13 is likely to fall into a full-bump state), the target load calculation part 43 uses the third target load related to virtual spring force control based on the stroke position ST as the combined target load without combining the first target load and the second target load.

According to the electrically powered suspension system 11 according to the fourth aspect, when the electromagnetic actuator 13 is likely to fall into a full-bump state, the target load calculation part 43 uses the third target load related to virtual spring force control based on the stroke position ST as the combined target load without combining the first target load and the second target load. As a result, even when a large input is applied to the damper while the vehicle 10 is traveling, it is possible to properly obtain the effect of maintaining a good ride quality by buffering such a large input, compared to the electrically powered suspension system 11 according to the second aspect, regardless of the calculation accuracy of the first target load or the second target load.

The determination regarding the virtual road surface input level VR is to be performed based on the information on the preview image. The resolution of the information on the preview image varies from time to time due to the influence from a disturbance such as weather, the brightness, and the shape type of the irregularity of the previewed road on which the vehicle 10 is traveling. For this reason, the accuracy of the determination regarding the virtual road surface input level VR varies from time to time due to the influence of the disturbance.

In view of this, an electrically powered suspension system 11 according to a fifth aspect is the electrically powered suspension system 11 according to the fourth aspect, wherein the target load calculation part 43 is further configured such that, even when the determiner part 61 has once made a determination that the virtual road surface input level VR has exceeded the first road surface input threshold value VRth1 and then canceled the determination, the target load calculation part 43 continues to use the third target load related to virtual spring force control based on the stroke position ST as the combined target load without combining the first target load and the second target load for a predetermined time from a time point at which the determination is canceled.

In the electrically powered suspension system 11 according to the fifth aspect, the target load calculation part 43 is configured such that, even when the determiner part 61 has once made a determination that the virtual road surface input level VR has exceeded the first road surface input threshold value VRth1 (the electromagnetic actuator 13 is likely to fall into a full-bump state) and then canceled the determination, the target load calculation part 43 continues to use the third target load related to virtual spring force control based on the stroke position ST as the combined target load without combining the first target load and the second target load for a predetermined time from a time point at which the determination is canceled. The length of this predetermined time may be set taking into account an aspect of preventing the electromagnetic actuator 13 from falling into a full-bump state.

According to the electrically powered suspension system 11 according to the fifth aspect, even when a determination that the electromagnetic actuator 13 is likely to fall into a full-bump state is once made and then the determination is canceled, the target load calculation part 43 continues to use the third target load related to virtual spring force control based on the stroke position ST as the combined target load without combining the first target load and the second target load for a predetermined time from a time point at which the determination is canceled. As a result, like the electrically powered suspension system 11 according to the fourth aspect, even when a large input is applied to the damper while the vehicle 10 is traveling, it is possible to properly obtain the effect of maintaining a good ride quality by buffering such a large input, regardless of the calculation accuracy of the first target load or the second target load.

An electrically powered suspension system 11 according to a sixth aspect is the electrically powered suspension system 11 according to the second or fourth aspect, wherein the load control part 45 may be further configured to, when the virtual road surface input level VR is determined by the determiner part 61 as having exceeded the first road surface input threshold value VRth1, advance the critical timing at which the stroke position ST is estimated as having reached the irregular range, in such a manner that the larger the virtual road surface input level VR, the earlier the critical timing is set advanced, and perform the load control of the electromagnetic actuator 13 using the combined target load upon the advanced critical timing.

In the electrically powered suspension system 11 according to the sixth aspect, the load control part 45 is further configured to, when the virtual road surface input level VR is determined by the determiner part 61 as having exceeded the first road surface input threshold value VRth1 (the electromagnetic actuator 13 is likely to fall into a full-bump state), advance the critical timing at which the stroke position ST is estimated as having reached the irregular range, in such a manner that the larger the virtual road surface input level VR, the earlier the critical timing is set advanced, and perform the load control of the electromagnetic actuator 13 using the combined target load upon the advanced critical timing.

Note that "the larger the virtual road surface input level VR, the earlier the critical timing is set advanced" is equivalent to "the larger the virtual road surface input level VR, the earlier the virtual spring force control, which actions in the anti-bumping direction, is started".

Hereinbelow, a description will be given of how the larger the virtual road surface input level VR, the earlier the load control part 45 sets the critical timing advanced.

In order to set the critical timing advanced earlier, the third target load calculation part 75 (see FIG. 4) sets an anti-bump characteristic (see FIG. 5B) defining the variation in the third target load with respect to the variation in the stroke position ST of the electromagnetic actuator 13, on the basis of the bump state determination result (low, high, very high) determined by the bump state determiner part 69 included in the determiner part 61.

Figure 5B:
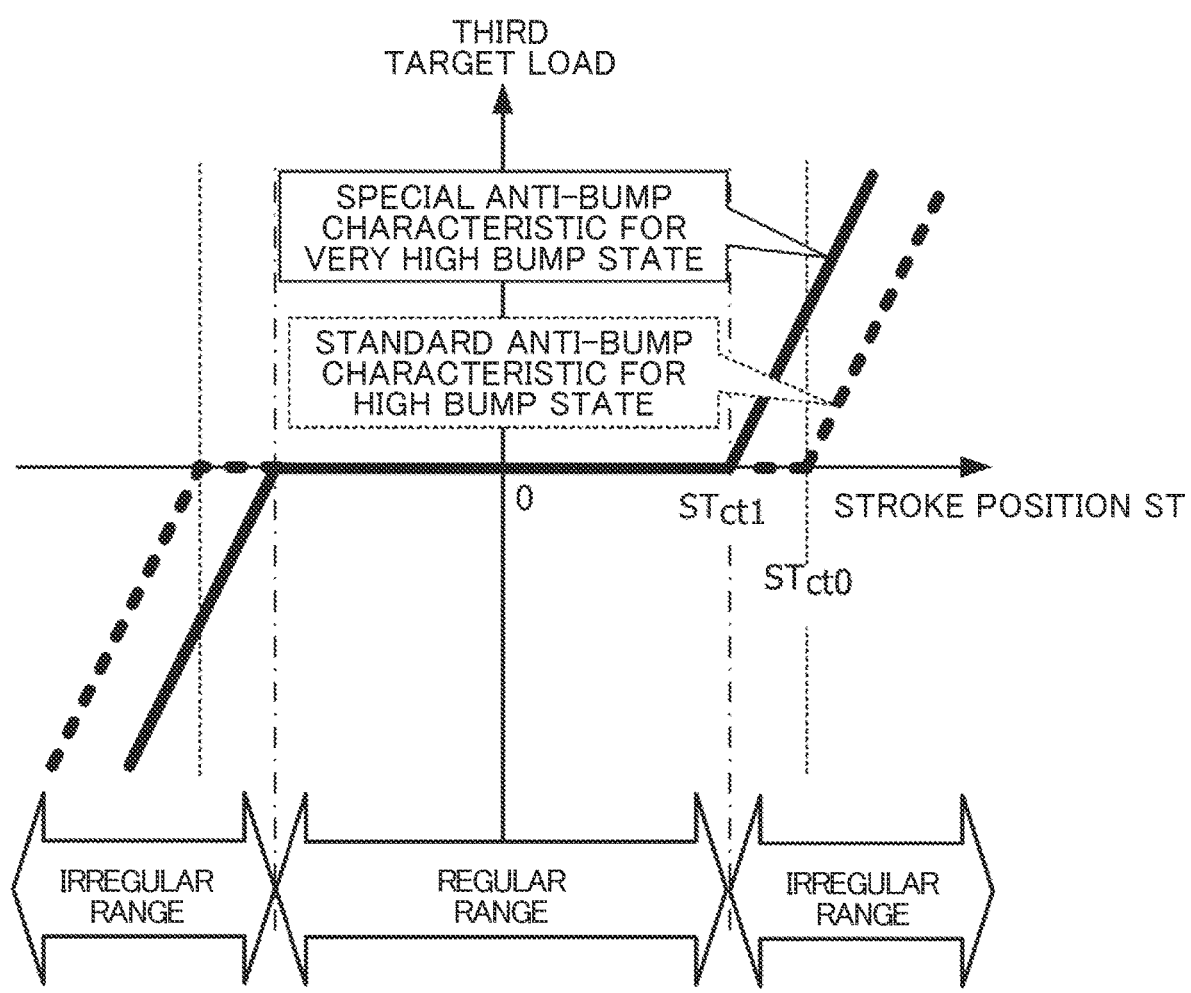
FIG. 5B is a conceptual diagram for explaining operations of the electrically powered suspension system according to the embodiment of the present invention.

Specifically, the third target load calculation part 75 (see FIG. 4) switches between a standard anti-bump characteristic for the high bump state and a standard anti-bump characteristic for the very high bump state as appropriate, as illustrated in FIG. 5B.

In the case of the high bump state, as illustrated in FIG. 5A, the bump state determiner part 69 (see FIG. 4) determines that the stroke position ST has reached the irregular range when the stroke position ST of the electromagnetic actuator 13 has exceeded the predetermined standard critical threshold value STct0.

In the case of the very high bump state, as illustrated in FIG. 5B, the bump state determiner part 69 (see FIG. 4) determines that the stroke position ST has reached the irregular range when the stroke position ST of the electromagnetic actuator 13 has exceeded the special critical threshold value STct1.

In the case of the high bump state, the third target load calculation part 75 applies the standard anti-bump characteristic illustrated in FIG. 5B to calculate the third target load corresponding to the stroke position ST.

In the case of the very high bump state, the third target load calculation part 75 applies the special anti-bump characteristic illustrated in FIG. 5B to calculate the third target load corresponding to the stroke position ST.

In short, the load control part 45 switch between a plurality of anti-bump characteristics (standard anti-bump characteristic, special anti-bump characteristic) prepared in advance in the third target load calculation part 75, according to the result of the bump state determination by the bump state determiner part 69. With this, the critical timing is controlled such that the larger the virtual road surface input level VR, the earlier the critical timing is set advanced.

According to the electrically powered suspension system 11 according to the sixth aspect, the load control part 45 is further configured to, when a determination is made that the electromagnetic actuator 13 is likely to fall into a full-bump state, advance the critical timing at which the stroke position ST is estimated as having reached the irregular range, in such a manner that the larger the virtual road surface input level VR, the earlier the critical timing is set advanced (the earlier the timing at which the virtual spring force control, which actions in the anti-bumping direction, starts), and perform the load control of the electromagnetic actuator 13 using the combined target load upon the advanced critical timing. As a result, it is possible to properly control the stroke amount of the electromagnetic actuator 13 such that even when a large input is applied to the damper while the vehicle 10 is traveling, the stroke amount is enlarged according to the magnitude of the input, compared to the electrically powered suspension system 11 according to the second or fourth aspect.

[Other Modifications]

The plurality of embodiments described above represent examples of embodying the present invention. Therefore, the technical scope of the present invention should not be construed to be limited to these embodiments. The present invention can be implemented in various embodiments without departing from the gist or the main scope of the present invention.

For example, the electrically powered suspension systems 11 according to the embodiments of the present invention have been described with an exemplary embodiment in which a total of four electromagnetic actuators 13 are arranged for both the front wheels (front left wheel and front right wheel) and the rear wheels (rear left wheel and rear right wheel). However, the present invention is not limited to this configuration. A total of two electromagnetic actuators 13 may be arranged in either the front wheels or the rear wheels.

In addition, the electrically powered suspension systems 11 according to the embodiments of the present invention have been described such that a load control part 45 performs load control on each of a plurality of electromagnetic actuators 13 separately. Specifically, the load control part 45 is configured to perform load control on each of electromagnetic actuators 13 provided respectively on the four wheels, separately.

Alternatively, the load control part 45 may be configured to perform load control of electromagnetic actuators 13 provided respectively on the four wheels, separately for the front wheels and for the rear wheels, or separately for the right wheels and the left wheels.

Lastly, although the electrically powered suspension systems 11 according to the exemplary embodiments of the present invention have been described with the electromagnetic actuator 13 having a ball screw type actuator as the drive mechanism, the present invention is not limited thereto.

The drive mechanism of the electromagnetic actuator 13 may be of any type, non-limiting examples of which include the linear motor type, the rack and pinion type, and the rotary type.

What is claimed is:

1. An electrically powered suspension system comprising:
   an actuator provided between a vehicle body and a wheel of a vehicle and configured to generate a load for damping vibration of the vehicle body;
   an information acquisition part configured to acquire information on a sprung state amount of the vehicle and information on a road surface state of a road on which the vehicle is traveling;
   a target load calculation part configured to calculate a first target load related to skyhook control based on the sprung state amount and to calculate a second target load related to preview control based on the road surface state of the road on which the vehicle is traveling; and a load control part configured to perform load control of the actuator using the calculation results of the target load calculation part, wherein the information acquisition part is further configured to acquire information on a stroke position of the actuator, wherein the electrically powered suspension system further comprises a determiner part configured to determine whether the stroke position has reached an irregular range out of a regular range, on the basis of the information on the stroke position, wherein the target load calculation part is further configured to, when the stroke position is determined by the determiner part as having reached the irregular range, calculate a third target load related to virtual spring force control based on the stroke position and to calculate a combined target load into which the first target load, the second target load, and the third target load have been combined, and wherein the load control part performs load control of the actuator using the combined target load.

2. The electrically powered suspension system according to claim 1, wherein the information acquisition part is further configured to acquire information on a preview image ahead in an advancing direction of the vehicle, wherein the determiner part is further configured to determine a virtual road surface input level based on the information on the preview image, and wherein the load control part is further configured such that when the virtual road surface input level is determined by the determiner part as having exceeded a predetermined road surface input threshold value, the load control part performs load control of the actuator using the combined target load upon a critical timing at which the stroke position is estimated as having reached the irregular range.

3. The electrically powered suspension system according to claim 2, wherein the load control part is further configured to, even when the virtual road surface input level is not determined by the determiner part as having exceeded the road surface input threshold value, perform load control of the actuator using the combined target load when the stroke position is determined as having reached the irregular range.

4. The electrically powered suspension system according to claim 2, wherein the target load calculation part is further configured to, when the virtual road surface input level is determined by the determiner part as having exceeded the road surface input threshold value, use the third target load related to virtual spring force control based on the stroke position as the combined target load without combining the first target load and the second target load.

5. The electrically powered suspension system according to claim 4, wherein the target load calculation part is further configured such that, even when the determiner part has once made a determination that the virtual road surface input level has exceeded the first road surface input threshold value and then canceled the determination, the target load calculation part continues to use the third target load related to virtual spring force control based on the stroke position as the combined target load without combining the first target load and the second target load for a predetermined time from a time point at which the determination is canceled.

6. The electrically powered suspension system according to claim 4, wherein the load control part is further configured to, when the virtual road surface input level is determined by the determiner part as having exceeded the road surface input threshold value, advance the critical timing at which the stroke position is estimated as having reached the irregular range, in such a manner that the larger the virtual road surface input level, the earlier the critical timing is set advanced, and perform the load control of the actuator using the combined target load upon the advanced critical timing.

7. The electrically powered suspension system according to claim 2, wherein the load control part is further configured to, when the virtual road surface input level is determined by the determiner part as having exceeded the road surface input threshold value, advance the critical timing at which the stroke position is estimated as having reached the irregular range, in such a manner that the larger the virtual road surface input level, the earlier the critical timing is set advanced, and perform the load control of the actuator using the combined target load upon the advanced critical timing.

* * * * *